United States Patent
Kanamori et al.

(10) Patent No.: US 11,417,981 B2
(45) Date of Patent: Aug. 16, 2022

(54) CONNECTOR WITH CAP

(71) Applicant: YAZAKI CORPORATION, Tokyo (JP)

(72) Inventors: Takanori Kanamori, Kakegawa (JP); Yoshitaka Tsushima, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/239,170

(22) Filed: Apr. 23, 2021

(65) Prior Publication Data

US 2021/0344136 A1 Nov. 4, 2021

(30) Foreign Application Priority Data

May 1, 2020 (JP) .............................. JP2020-081343

(51) Int. Cl.
*H01R 13/506* (2006.01)
*B60L 53/16* (2019.01)
*H01R 13/52* (2006.01)

(52) U.S. Cl.
CPC ............ *H01R 13/506* (2013.01); *B60L 53/16* (2019.02); *H01R 13/5213* (2013.01); *H01R 2201/26* (2013.01)

(58) Field of Classification Search
CPC . B60L 53/16; B60K 15/0406; B60K 15/0451; B60K 15/05; H01R 13/506; H01R 13/5219; H01R 13/5213
See application file for complete search history.

(56) References Cited

U.S. PATENT DOCUMENTS

| | | | | |
|---|---|---|---|---|
| 5,501,607 | A * | 3/1996 | Yoshioka | E05D 11/105 220/259.2 |
| 5,800,188 | A * | 9/1998 | Barber | B60D 1/64 439/651 |
| 7,331,792 | B2 * | 2/2008 | Cummings | H01R 13/745 439/35 |
| 9,325,363 | B2 * | 4/2016 | Ferraro | H01R 13/5213 |
| 9,379,481 | B2 * | 6/2016 | Kashiwada | H01R 13/5213 |
| 9,543,678 | B2 * | 1/2017 | Shimizu | H01R 4/72 |

FOREIGN PATENT DOCUMENTS

| | | |
|---|---|---|
| DE | 44 16 992 A1 | 11/1994 |
| EP | 3 299 266 A2 | 3/2018 |
| JP | 2017-204431 A | 11/2017 |

* cited by examiner

*Primary Examiner* — Briggitte R. Hammond
(74) *Attorney, Agent, or Firm* — Sughrue Mion, PLLC

(57) ABSTRACT

A connector includes a connector housing and a cap. The connector housing has a terminal accommodating portion formed with a bottomed tubular cavity. The cap has a cap body configured to cover an opening portion of the cavity, a tubular portion vertically provided on a rear surface of the cap body and configured to be fitted into a tubular inner surface of the cavity in a fitting direction, a contact portion facing an opening edge portion of the cavity, provided on the cap body, and located outward than a root of the tubular portion in a radial direction of the cap body, and a recessed portion provided on the rear surface of the cap body between the root of the tubular portion and the contact portion.

3 Claims, 7 Drawing Sheets

CONNECTOR WITH CAP

CROSS-REFERENCE TO RELATED APPLICATIONS

This application is based on and claims priority under 35 USC 119 from Japanese Patent Application No. 2020-081343 filed on May 1, 2020, the contents of which are incorporated herein by reference.

TECHNICAL FIELD

The present disclosure relates to a connector with a cap.

BACKGROUND ART

In order to charge a battery of an electric vehicle or a plug-in hybrid vehicle, a vehicle-side connector to be fitted to a charging connector connected to an external power supply is provided at a vehicle side.

This type of vehicle-side connector is provided with a cover member (cap) that covers an opening portion of a connector housing so that water or dust does not enter the connector when the connector is not in use (see JP-A-2017-204431 and the like).

As shown in FIG. 7, such a connector 515 includes a connector housing 540 that accommodates a male terminal 520 and is provided with an opening portion 545 at a tip side of the male terminal 520, and a cover member 560 that covers the opening portion 545 of the connector housing 540.

The connector housing 540 includes a terminal accommodating portion 541 that accommodates the male terminal 520 and a hood portion 543 that surrounds the terminal accommodating portion 541. A space S that opens forward is provided all over the entire circumference between the hood portion 543 and the terminal accommodating portion 541 so as to allow a hood portion of a counterpart connector to enter the space S.

The terminal accommodating portion 541 is a tubular body having an oval shape, and the opening portion 545 is provided at a front side of the terminal accommodating portion 541. A pair of cavities 547 that respectively accommodates a pair of male terminals 520 from a rear side is provided in the terminal accommodating portion 541.

The cover member 560 includes a lid portion 561 that covers the opening portion 545 of the connector housing 540, and a handle member 570 that is gripped when the cover member 560 is removed.

The lid portion 561 is a flat plate shaped member. An insertion portion 563 that can be externally fitted to the terminal accommodating portion 541 is provided at a rear surface side (rear side) of the lid portion 561.

The insertion portion 563 is a tubular body having an oval shape, and can be inserted into the space S between the hood portion 543 and the terminal accommodating portion 541. An inner diameter of the insertion portion 563 equals to an outer diameter of the terminal accommodating portion 541, and an outer diameter of the insertion portion 563 is smaller than an inner diameter of the hood portion 543. Therefore, the cover member 560 is mounted to the connector housing 540 in a state where the insertion portion 563 is externally fitted to the terminal accommodating portion 541 and the lid portion 561 covers the opening portion 545.

Generally, the lid portion 561 and the insertion portion 563 of the cover member 560 are integrally molded by injecting an insulating resin into a cavity of a mold. In addition, a chamfered portion such as an R-chamfered portion or a tapered chamfered portion is generally formed at an inner corner portion 571 between a rear surface of the lid portion 561 and an inner peripheral surface of the insertion portion 563 in consideration of strength of the mold and durability of a product.

However, in the connector 515 as described above, when the insertion portion 563 of the cover member 560 mounted to the connector housing 540 is externally fitted to the terminal accommodating portion 541, the rear surface of the lid portion 561 comes into contact with an opening end portion of the terminal accommodating portion 541. Therefore, when the opening end portion of the terminal accommodating portion 541 comes onto the chamfered portion formed at the inner corner portion 571 and interferes with the chamfered portion, operability at the time of closing the cover member 560 may be deteriorated or the cover member 560 may be inserted incompletely (mounted incompletely). When the chamfered portion is provided at the opening end portion of the terminal accommodating portion 541 in a manner of avoiding the interference, a thickness of the opening end portion is reduced, and thus strength of the opening end portion is reduced and the opening end portion may be damaged due to repeated fitting with a counterpart connector.

SUMMARY OF INVENTION

The present disclosure has been made in view of the above circumstances, and an object of the present disclosure is to provide a connector with a cap that can prevent incomplete insertion of the cap and can improve assembling workability of the cap.

In order to achieve the above-described object of the present disclosure, the connector has the following configuration.

(1) There is provided a connector including:
a connector housing having a terminal accommodating portion formed with a bottomed tubular cavity, a terminal fitting being provided in the tubular cavity and being configured to be connected to a counterpart terminal fitting of a counterpart connector; and
a cap having:
a cap body configured to cover an opening portion of the cavity;
a tubular portion vertically provided on a rear surface of the cap body and configured to be fitted into a tubular inner surface of the cavity in a fitting direction;
a contact portion facing an opening edge portion of the cavity, provided on the cap body, and located outward than a root of the tubular portion in a radial direction of the cap body; and
a recessed portion provided on the rear surface of the cap body between the root of the tubular portion and the contact portion.

According to the present disclosure, it is possible to provide a connector that can prevent incomplete insertion of the cap and can improve assembling workability of the cap.

The present disclosure has been briefly described as above. Further, details of the present disclosure will be clarified by reading an aspect (hereinafter, referred to as an "embodiment") for implementing the invention to be described below with reference to the accompanying drawings.

BRIEF DESCRIPTION OF DRAWINGS

FIGS. 4A and 4B are cross-sectional views showing main portions of the connector, in which FIG. 4A shows a state before the cap is mounted to a connector housing and FIG. 4B shows a state in a course of mounting the cap to the connector housing.

DESCRIPTION OF EMBODIMENTS

Hereinafter, an example of an embodiment according to the present disclosure will be described with reference to the drawings.

Figure 1:
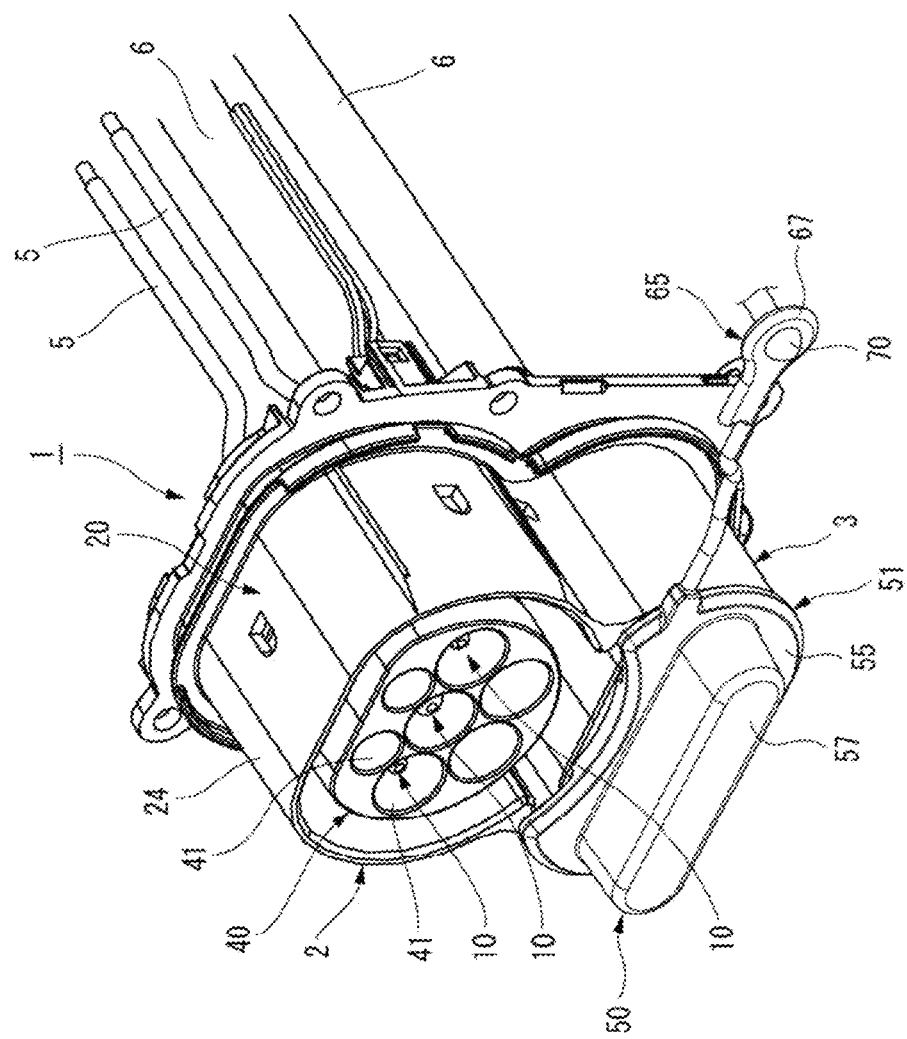
FIG. 1 is a perspective view showing a connector with a cap according to an embodiment of the present disclosure.
Figure 2:
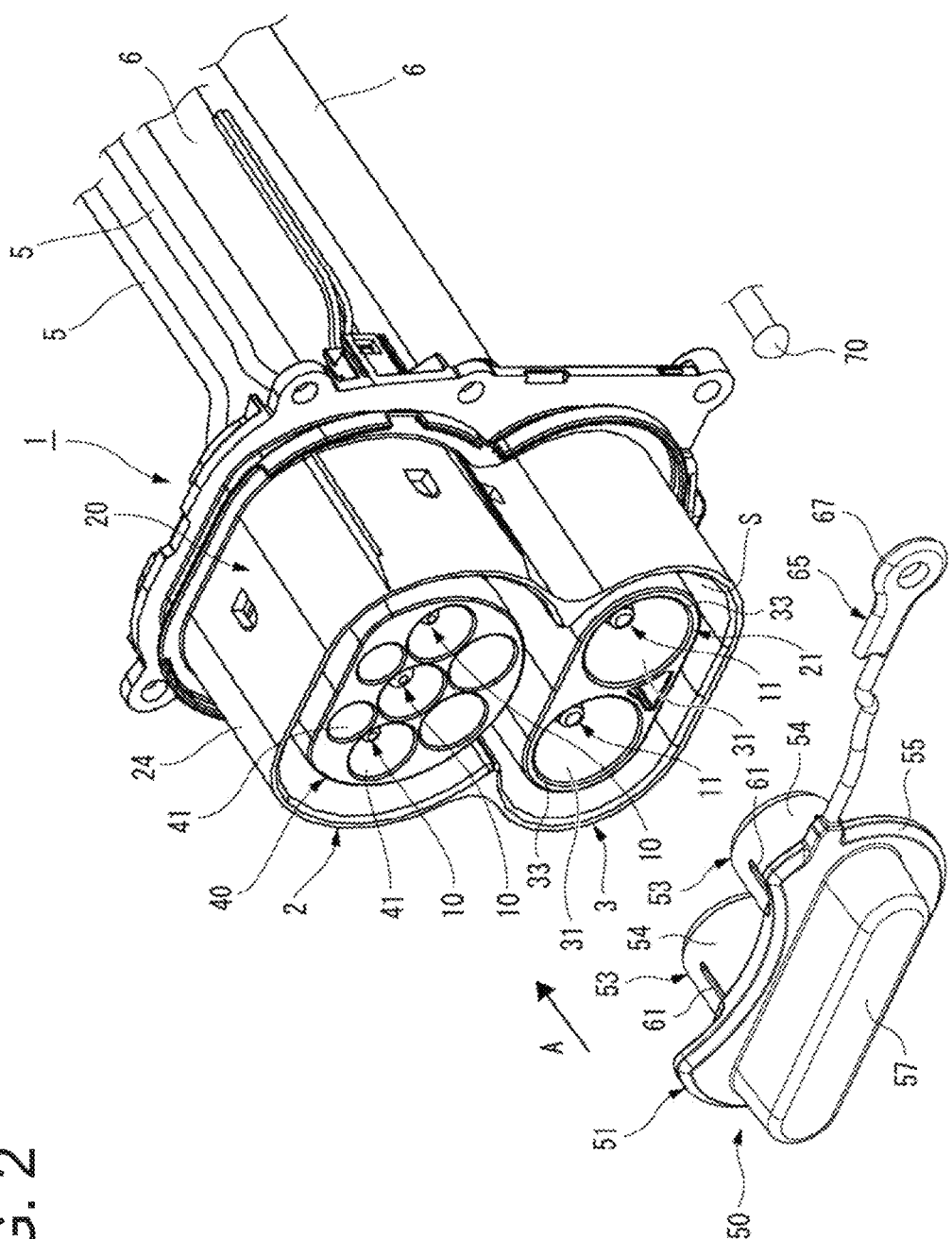
FIG. 2 is an exploded perspective view showing the connector shown in FIG. 1.

FIG. 1 is a perspective view showing a connector 1 with a cap (hereinafter, simply referred to as the connector (1)) according to an embodiment of the present disclosure. FIG. 2 is an exploded perspective view showing the connector 1 shown in FIG. 1.

The connector 1 according to the present embodiment is, for example, a connector mounted in a vehicle such as a hybrid vehicle or an electric vehicle and is a vehicle-side connector to be fitted to a charging connector (counterpart connector). The connector 1 according to the present embodiment includes a normal charging connector 2 for normal charging and a quick charging connector 3 to be fitted to a charging connector for supplying a direct current.

The quick charging connector 3 is detachably provided with a cap 50 that can cover a terminal accommodating portion 21 when quick charging is not performed. The normal charging connector 2 is detachably provided with a cap (not shown) that covers a cavity 41 when charging is not performed.

As shown in FIG. 2, the normal charging connector 2 includes a terminal fitting 10 to be connected to a counterpart terminal fitting of a counterpart connector (not shown), a connector housing 20 that accommodates the terminal fitting 10, and a front holder 40 formed with a bottomed tubular cavity 41 in which the terminal fitting 10 is disposed. A plurality of electric wires 5 are connected to the terminal fittings 10 accommodated in the connector housing 20.

As shown in FIG. 2, the quick charging connector 3 includes a terminal fitting 11 to be connected to a counterpart terminal fitting of a counterpart connector (not shown), the connector housing 20 that accommodates the terminal fitting 11, and the cap 50. In the present embodiment, a side where the cap 50 is mounted is a front side of the connector housing 20, and a side of the cap 50 mounted to the connector housing 20 is a rear side of the cap 50.

The terminal fitting 11 includes a terminal body 12 and an insulating cap 19 provided at a tip end of the terminal body 12 (see FIG. 4). The terminal body 12 is a male terminal formed of a conductive metal such as copper or a copper alloy. The terminal body 12 includes a terminal connection portion 13 to be connected to a female terminal that is a counterpart terminal fitting, an electric wire connection portion 17 to be connected to an electric wire 6, and a flange portion 15 provided between the terminal connection portion 13 and the electric wire connection portion 17.

The terminal connection portion 13 is formed into a round pin shape having a diameter smaller than a diameter of the electric wire connection portion 17 and having equal diameter over the entire length of the terminal connection portion 13, and the insulating cap 19 is mounted to a tip end portion of the terminal connection portion 13. The electric wire connection portion 17 is electrically connected to the electric wire 6 by inserting a core wire exposed from an insulating sheath at an end portion of the electric wire 6 into a tubular portion and crimping the core wire. The flange portion 15 protrudes toward an outer peripheral side in a flange shape.

The connector housing 20 is formed of a synthetic resin, and includes the terminal accommodating portion 21 provided with a bottomed tubular cavity 31 in which the terminal fitting 11 to be connected to a counterpart terminal fitting of a charging connector is disposed, and a hood portion 24 that surrounds the terminal accommodating portion 21. In the connector housing 20, the normal charging connector 2 and the quick charging connector 3 are attached together to a vehicle body.

The hood portion 24 is provided on an outer periphery of the terminal accommodating portion 21 and surrounds the entire periphery of the terminal accommodating portion 21. A space S that opens forward is provided all over the entire circumference of the connector housing 20 between the hood portion 24 and the terminal accommodating portion 21 so as to allow a hood portion of a charging connector to enter the space S.

The terminal accommodating portion 21 is a tubular body having an oval shape that is horizontally long in a width direction in a front view, and is formed with an opening portion at a front side. A pair of bottomed tubular cavities 31 is provided in the terminal accommodating portion 21, and the terminal connection portions 13 of a pair of terminal fittings 11 respectively pass through the pair of bottomed tubular cavities 31 from a rear side. The pair of cavities 31 is formed side by side in the width direction. The flange portion 15 of the terminal fitting 11 is brought into contact with a partition wall 22 of the terminal accommodating portion 21 so as to position the terminal fitting 11, in which the partition wall 22 of the terminal accommodating portion 21 serves as a bottom portion of the cavity 31.

Figure 3A:
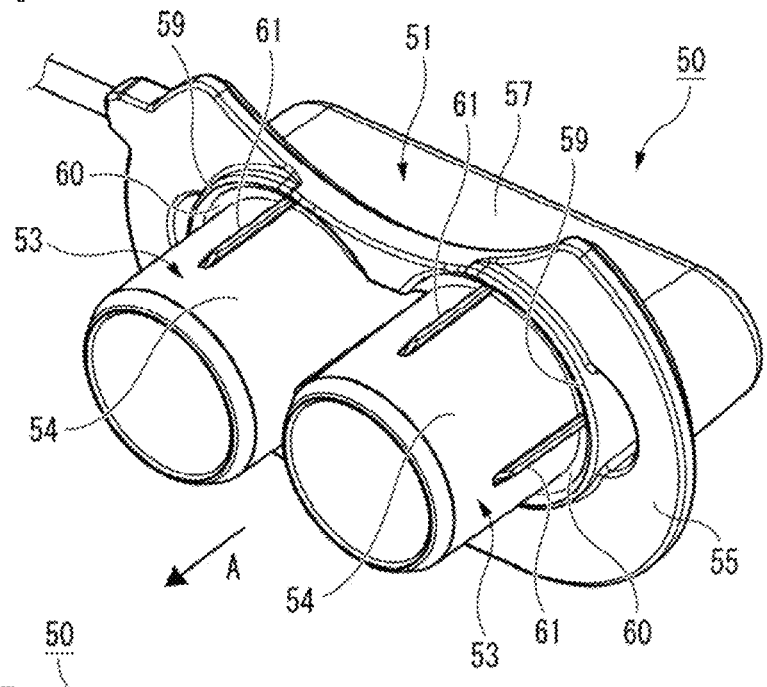
FIG. 3A and FIG. 3B are a perspective view and a rear view showing the cap shown in FIG. 2 as viewed from a rear side.
Figure 3B:
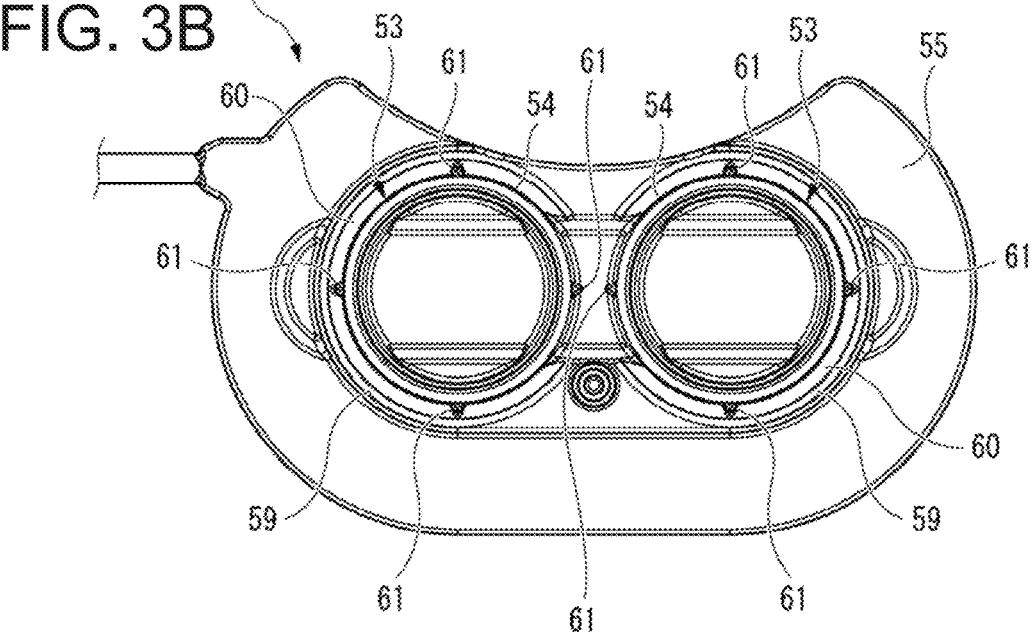

FIG. 3A is a perspective view and FIG. 3B is a rear view showing the cap 50 shown in FIG. 2 as viewed from a rear side.

The cap 50 is formed of, for example, an elastic resin material such as rubber and silicon. As shown in FIG. 3A, the cap 50 is integrally formed with a cap body 51 that covers opening portions of the cavities 31, a pair of tubular portions 53 that is vertically provided on a rear surface of the cap body 51 and is respectively fitted into tubular inner surfaces of the pair of cavities 31, and a fall prevention strap 65 (see FIG. 2).

The cap body 51 includes a flange portion 55 that is formed into a flat plate shape and covers an opening of the space S, and an outer shape of the cap body 51 is the same as an outer shape of the hood portion 24. A gripping portion 57 is formed at a front surface side of the cap body 51 that is a side where the cap 50 is removed.

Further, the cap body 51 is formed with contact portions 59 that respectively face opening edge portions 33 of the cavities 31 at a radially outer side of a root of each of the tubular portions 53. A recessed portion 60 extending in a circumferential direction along the root of each of the tubular portions 53 is formed on a rear surface of the cap body 51 between the root of the tubular portion 53 and the contact portion 59.

The tubular portion 53 is a tubular body and is fitted into a tubular inner surface of the cavity 31. An outer diameter of the tubular portion 53 is slightly smaller than an inner diameter of the cavity 31, and a total length of the tubular portion 53 is set to a dimension at which the tubular portion 53 is inserted into a front half portion of the cavity 31. A pair of tubular portions 53 is arranged corresponding to the pair of cavities 31 and is arranged side by side in the width direction.

A plurality of (four in the present embodiment) positioning ribs 61 are provided on an outer peripheral surface 54 of the tubular portion 53. The plurality of positioning ribs 61 extend in a cap insertion direction A from the recessed portion 60 and are arranged at equal intervals in a circumferential direction. The positioning ribs 61 are elastically deformed when the tubular portion 53 is fitted into the tubular inner surface of the cavity 31.

As shown in FIG. 1, a fixing pin 70 passes through a locking hole formed in a fixing end portion 67 at a free end side of the fall prevention strap 65, so that the fall prevention strap 65 is locked. The fixing pin 70 is provided at the connector housing 20 or a vehicle body in the vicinity of the connector housing 20.

Next, an operation of mounting the cap 50 to the terminal accommodating portion 21 of the connector housing 20 in the connector 1 having the above-described structure will be described.

Figure 4A:
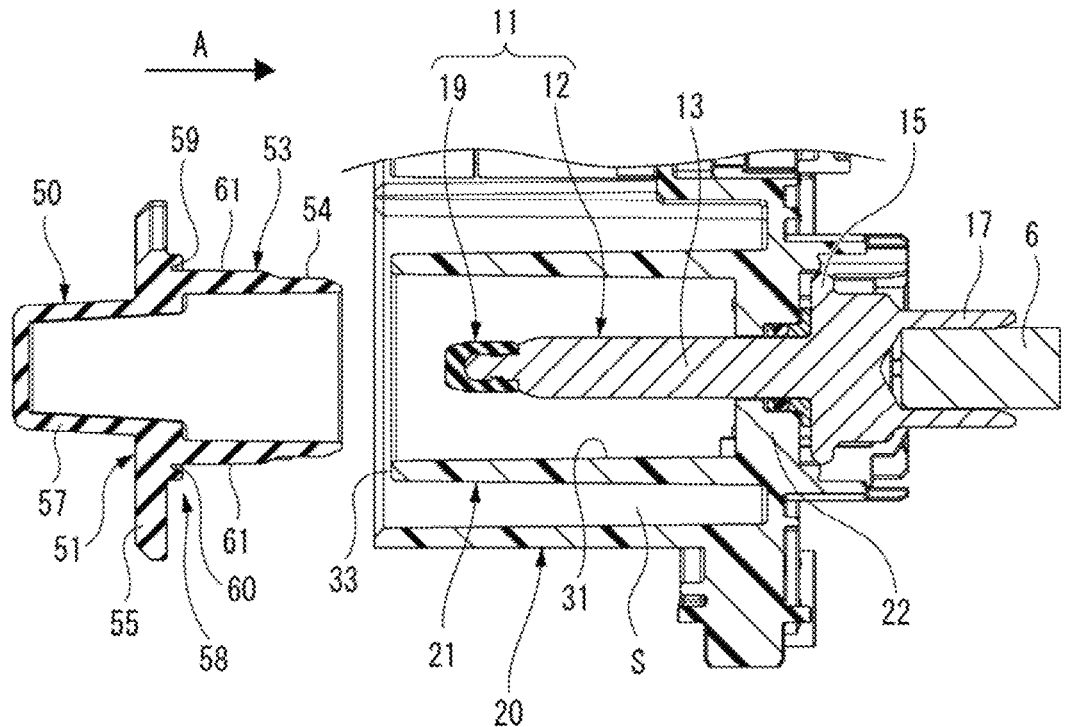
Figure 4B:
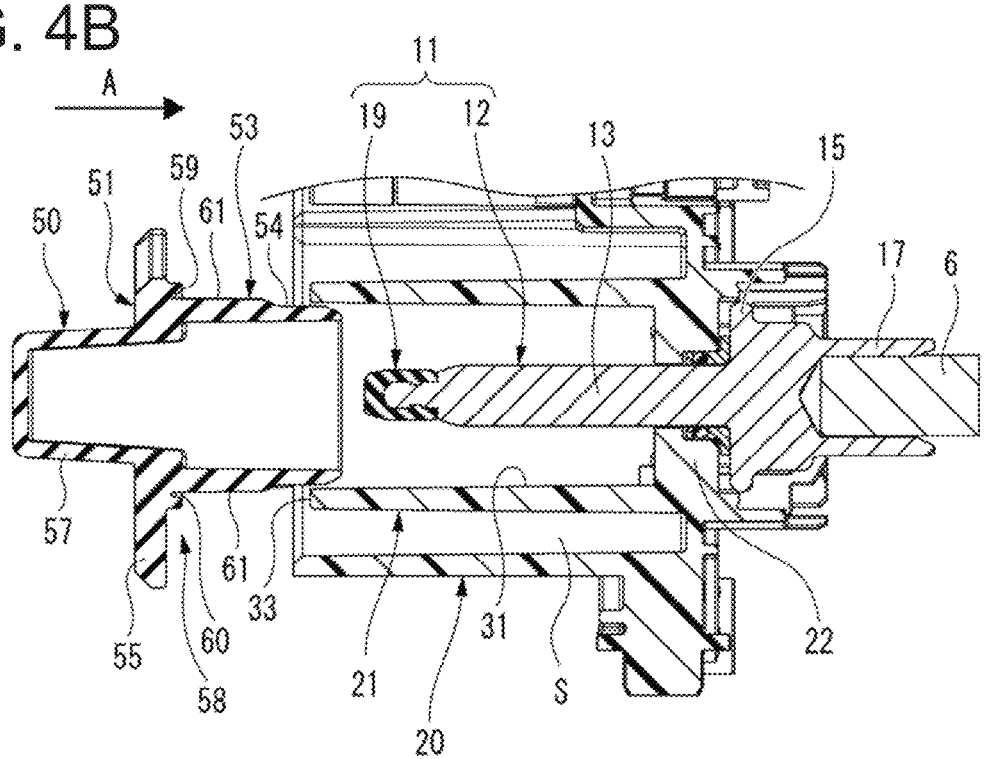
Figure 5:
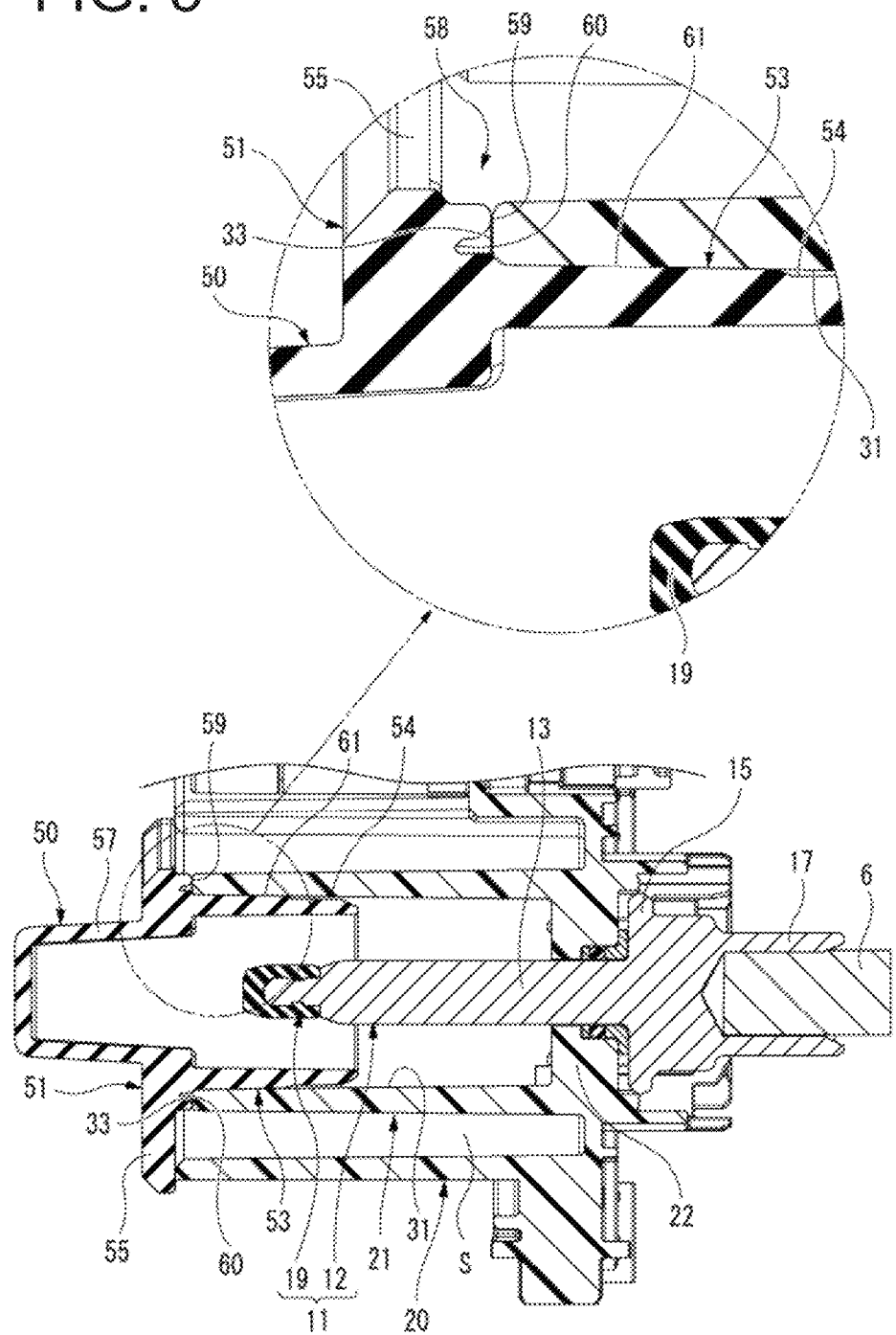
FIG. 5 is a cross-sectional view showing main portions in a state in which the cap is mounted to a terminal accommodating portion of the connector housing and is an enlarged view showing a cap fitting portion.
Figure 6:
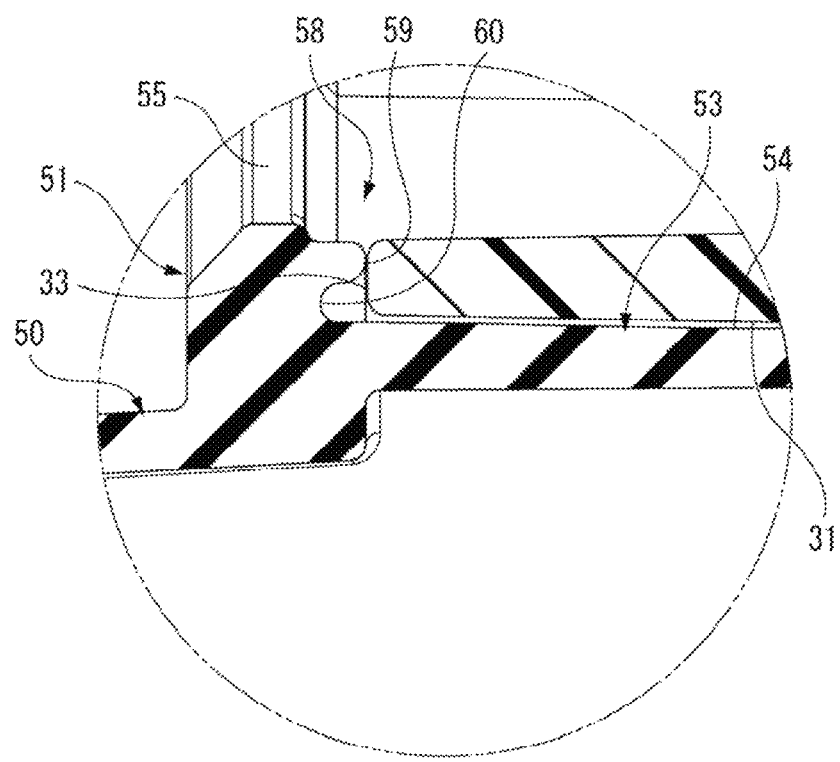
FIG. 6 is an enlarged view showing the cap fitting portion in a cross section different from that in FIG. 5.
Figure 7:
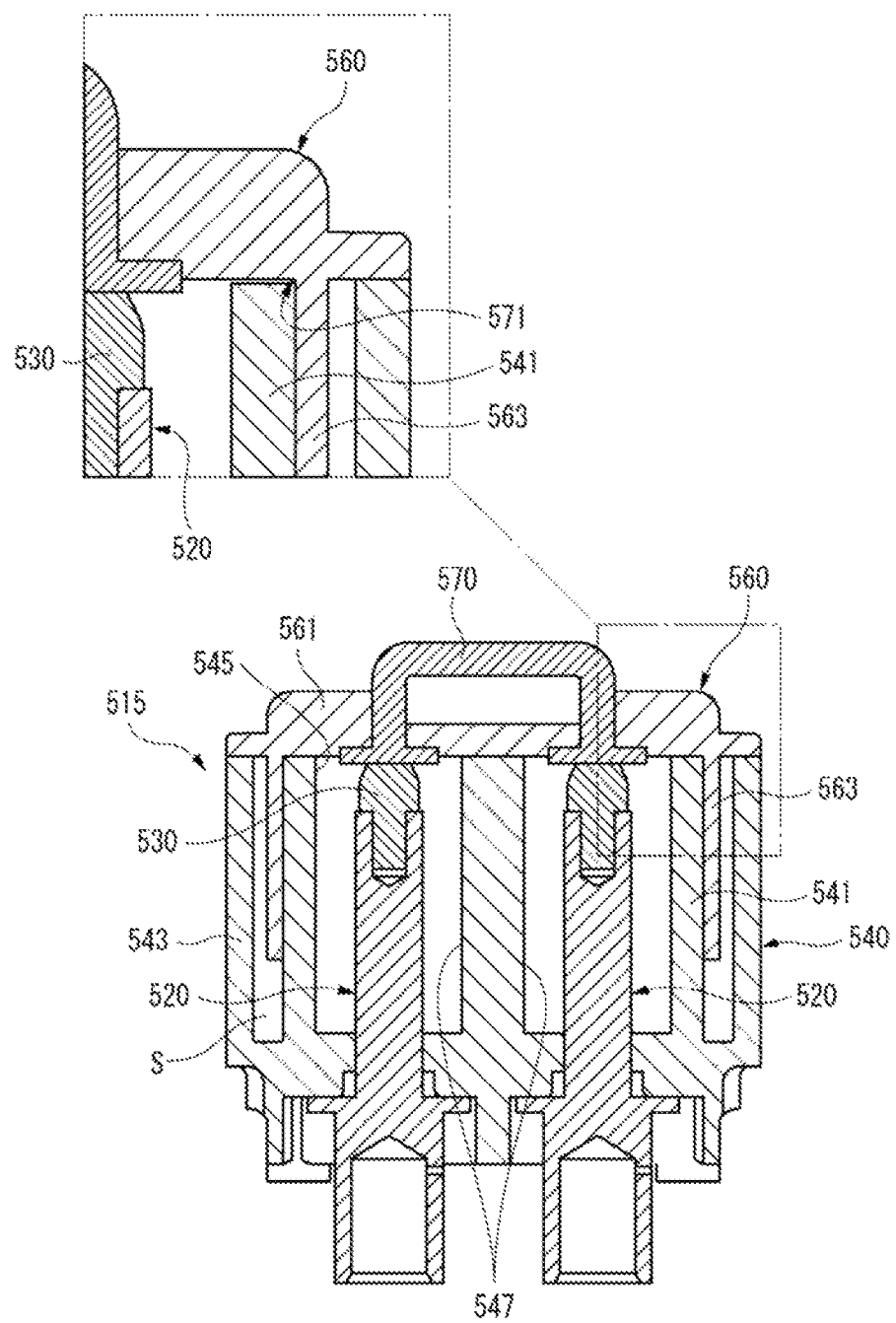
FIG. 7 is a longitudinal sectional view and a partially enlarged view showing a connector in the related art.

FIGS. 4A and 4B are cross-sectional views showing main portions of the connector 1, in which FIG. 4A shows a state before the cap 50 is mounted to the connector housing 20 and FIG. 4B shows a state in a course of mounting the cap 50 to the connector housing 20. FIG. 5 is a cross-sectional view showing main portions in a state in which the cap 50 is mounted to the terminal accommodating portion 21 of the connector housing 20 and is an enlarged view showing a cap fitting portion. FIG. 6 is an enlarged view showing the cap fitting portion in a cross section different from that in FIG. 5.

When mounting the cap 50 to the terminal accommodating portion 21 of the connector housing 20, as shown in FIG. 4A, an operator grips the gripping portion 57 of the cap 50 to let the tubular portion face the opening portion of the corresponding cavity 31 of the terminal accommodating portion, and then presses the cap 50 against the connector housing 20 so that the tubular portion is fitted into a tubular inner surface of the cavity.

When the cap 50 is pressed against the connector housing 20 in this manner, as shown in FIG. 4B, first, a tip end of the tubular portion 53 is fitted into the opening portion of the cavity 31. Thereafter, the four positioning ribs 61 provided on the outer peripheral surface 54 of the tubular portion 53 are brought into sliding contact with the tubular inner surface of the cavity 31, and the tubular portion 53 is inserted and guided while being positioned relative to the cavity 31 of the terminal accommodating portion 21 by the plurality of positioning ribs 61.

When the tubular portion 53 is fitted into the tubular inner surface of the cavity 31, the positioning ribs 61 come into contact with the tubular inner surface of the cavity 31 and are elastically deformed so as to be compressed, so that the tubular portion 53 can be appropriately fitted into the tubular inner surface of the cavity 31. Therefore, when mounting the cap 50 to the terminal accommodating portion 21 of the connector housing 20, assembling, including a final pressing to bring the contact portion 59 of the cap body 51 into contact with the opening edge portion 33 of the cavity 31, can be performed with a constant force, and workability for the operator can be improved.

As shown in FIG. 5, of the cap 50 mounted to the terminal accommodating portion 21 of the connector housing 20, the tubular portion 53 vertically provided on the rear surface of the cap body 51 is fitted into the tubular inner surface of the cavity 31 formed in the terminal accommodating portion 21 of the connector housing 20. The cap 50 of which the tubular portion 53 is fitted into and held on the tubular inner surface of the cavity 31 can cover the opening portion of the cavity 31 with the cap body 51. Therefore, the connector housing 20 reliably prevents water and dust from entering the cavity 31.

As shown in FIG. 6, when the tubular portion 53 is fitted into the tubular inner surface of the cavity 31, the opening edge portion 33 of the cavity 31 facing the tubular portion 53 comes into contact with the contact portion 59 on the rear surface of the cap body 51. The recessed portion 60 extending in the circumferential direction along the root of the tubular portion 53 is formed in a rear surface of the cap body 51 between the root of the tubular portion 53 and the contact portion 59. A chamfered portion formed at an inner corner portion 58 between the rear surface of the cap body 51 and the outer peripheral surface 54 of the tubular portion 53 is disposed in the recessed portion 60. Therefore, the inner corner portion 58 between the rear surface of the cap body 51 and the outer peripheral surface 54 of the tubular portion 53 is not formed with a chamfered portion that will interfere with the opening edge portion 33 of the cavity 31 when the contact portion 59 of the cap body 51 comes into contact with the opening edge portion 33 of the cavity 31.

Therefore, it is possible to provide the connector 1 that prevents the opening edge portion 33 of the cavity 31 from coming onto the chamfered portion of the inner corner portion 58 and interfering with the chamfered portion of the inner corner portion 58, prevents deterioration of operability at the time of closing the cap 50, and prevents incomplete insertion of the cap 50.

In the connector 1 having the above-described configuration, it is only necessary to change the cap 50 that is easily molded compared with the connector housing 20 whose mold is difficult to change without a need to change the terminal accommodating portion 21 of the connector housing 20. In addition, since the recessed portion 60 formed in the rear surface of the cap body 51 between the root of the tubular portion 53 and the contact portion 59 is provided in a mold opening direction at the time of integrally molding the cap 50, a mold having a complicated structure including an undercut portion is not required. Therefore, an increase in manufacturing costs of the cap 50 can be prevented.

The flange portion 55 that covers the opening of the space S is integrally molded with the cap body 51. Therefore, the flange portion 55 integrally molded with the cap body 51 can simultaneously cover both the opening of the space S provided between the hood portion 24 and the terminal accommodating portion 21 and the opening portion of the cavity 31. Therefore, water, dust, and the like can be prevented from entering the space S provided between the hood portion 24 and the terminal accommodating portion 21.

The fall prevention strap 65 is integrally molded with the cap 50 according to the present embodiment. Therefore, according to the connector 1 in the present embodiment, the cap 50 detached from the terminal accommodating portion 21 of the connector housing 20 is prevented from falling by fixing the fixing end portion 67 of the fall prevention strap 65 integrally molded with the cap 50 to the connector housing 20 or in the vicinity of the connector housing 20.

According to the connector 1 in the present embodiment described above, it is possible to improve assembling workability of the cap 50 and prevent incomplete insertion of the cap 50.

The present disclosure is not limited to the embodiment described above, and may be appropriately modified, improved, and the like. In addition, materials, shapes, dimensions, numbers, arrangement positions, and the like of components in the embodiment described above are optional and are not limited as long as the present disclosure can be achieved.

For example, in the embodiment described above, the cap 50 is a cap that covers the cavity 31 of the quick charging connector 3. Alternatively, the cap according to the present disclosure may be a cap that covers the cavity 41 of the normal charging connector 2.

Features of the embodiment of the connector according to the present disclosure described above is briefly summarized and listed in the following [1] to [4].

[1] A connector (1) including:
a connector housing (20) having a terminal accommodating portion (21) formed with a bottomed tubular cavity (31), a terminal fitting (11) being provided in the tubular cavity and being configured to be connected to a counterpart terminal fitting of a counterpart connector; and
a cap (50) including:
a cap body (51) configured to cover an opening portion of the cavity (31);
a tubular portion (53) vertically provided on a rear surface of the cap body (51) and configured to be fitted into a tubular inner surface of the cavity (31) in a fitting direction (A);
a contact portion (59) facing an opening edge portion (33) of the cavity (31), provided on the cap body, and located outward than a root of the tubular portion (53) in a radial direction of the cap body (51); and
a recessed portion (60) provided on the rear surface of the cap body (51) between the root of the tubular portion (53) and the contact portion (59).

[2] The connector (1) according to [1], in which
an outer peripheral surface (54) of the tubular portion (53) is provided with a plurality of positioning ribs (61) that extend from the recessed portion (60) in the fitting direction (a cap insertion direction) (A) and are arranged at equal intervals in a circumferential direction of the outer peripheral surface of the tubular portion (53).

[3] The connector (1) according to [1] or [2], in which
the connector housing (20) has a hood portion (24) that surrounds the terminal accommodating portion (21);
a space (S) that opens forward is provided all over the entire circumference of the connector housing (20) between the hood portion (24) and the terminal accommodating portion (21) so as to allow a counterpart hood portion of the counterpart connector to enter the space S; and
the cap body (51) has a flange portion (55) that covers an opening of the space (S).

[4] The connector (1) according to any one of [1] to [3], in which
the cap (50) has a fall prevention strap (65).

(1) There is provided a connector including:
a connector housing having a terminal accommodating portion formed with a bottomed tubular cavity, a terminal fitting being provided in the tubular cavity and being configured to be connected to a counterpart terminal fitting of a counterpart connector; and
a cap having:
a cap body configured to cover an opening portion of the cavity;
a tubular portion vertically provided on a rear surface of the cap body and configured to be fitted into a tubular inner surface of the cavity in a fitting direction;
a contact portion facing an opening edge portion of the cavity, provided on the cap body, and located outward than a root of the tubular portion in a radial direction of the cap body; and
a recessed portion provided on the rear surface of the cap body between the root of the tubular portion and the contact portion.

According to the connector having the configuration of (1), of the cap mounted to the terminal accommodating portion of the connector housing, the tubular portion vertically provided on the rear surface of the cap body is fitted into the tubular inner surface of the cavity formed in the terminal accommodating portion of the connector housing. The cap of which the tubular portion is fitted into and held on the tubular inner surface of the cavity can cover the opening portion of the cavity with the cap body.

When the tubular portion is fitted into the tubular inner surface of the cavity, the opening edge portion of the cavity facing the tubular portion comes into contact with the contact portion on the rear surface of the cap body. The recessed portion extending in the circumferential direction along the root of the tubular portion is formed in a rear surface of the cap body between the root of the tubular portion and the contact portion. A chamfered portion formed at an inner corner portion between the rear surface of the cap body and the outer peripheral surface of the tubular portion is disposed in the recessed portion. Therefore, the inner corner portion between the rear surface of the cap body and the outer peripheral surface of the tubular portion is not formed with a chamfered portion that will interfere with the opening edge portion of the cavity when the contact portion of the cap body comes into contact with the opening edge portion of the cavity.

Therefore, it is possible to provide the connector that prevents the opening edge portion of the cavity from coming onto the chamfered portion of the inner corner portion and interfering with the chamfered portion of the inner corner portion, prevents deterioration of operability at the time of closing the cap, and prevents incomplete insertion of the cap.

In the connector having the above-described configuration, it is only necessary to change the cap that is easily molded compared with the connector housing whose mold is difficult to change without a need to change the terminal accommodating portion of the connector housing. In addition, since the recessed portion formed in the rear surface of the cap body between the root of the tubular portion and the contact portion is provided in a mold opening direction at the time of integrally molding the cap, a mold having a complicated structure including an undercut portion is not required. Therefore, an increase in manufacturing costs of the cap can be prevented.

According to the connector having the configuration of (2), when the cap is mounted to the terminal accommodating portion of the connector housing, the tubular portion is inserted and guided while being positioned relative to the cavity of the terminal accommodating portion by the plurality of positioning ribs. When the tubular portion is fitted into the tubular inner surface of the cavity, the positioning ribs are elastically deformed, so that the tubular portion can be appropriately fitted into the tubular inner surface of the cavity.

Therefore, when the cap is mounted to the terminal accommodating portion of the connector housing, assembling, including a final pressing to bring the contact portion of the cap body into contact with the opening edge portion of the cavity, can be performed with a constant force, and workability for an operator can be improved.

According to the connector having the configuration of (3), the cap body has the flange portion, for example, the flange portion is integrally molded with the cap body. Therefore the flange portion can simultaneously cover both the opening of the space provided between the hood portion and the terminal accommodating portion and the opening portion of the cavity. Therefore, water, dust, and the like can be prevented from entering the space provided between the hood portion and the terminal accommodating portion.

According to the connector having the configuration of (4), the cap has a fall prevention strap, and the cap detached from the terminal accommodating portion of the connector housing is prevented from falling by fixing a fixing end portion of the fall prevention strap integrally molded with the cap to the connector housing or in the vicinity of the connector housing.

What is claimed is:

1. A connector comprising:
   a connector housing comprising a terminal accommodating portion formed with a bottomed tubular cavity, wherein a terminal fitting is provided in the tubular cavity and is configured to be connected to a counterpart terminal fitting of a counterpart connector; and
   a cap comprising:
      a cap body configured to cover an opening portion of the cavity;
      a tubular portion vertically provided on a rear surface of the cap body and configured to be fitted into a tubular inner surface of the cavity in a fitting direction;
      a contact portion facing an opening edge portion of the cavity, provided on the cap body, and located outward of a root of the tubular portion in a radial direction of the cap body; and
      a recessed portion provided on the rear surface of the cap body between the root of the tubular portion and the contact portion,
   wherein an outer peripheral surface of the tubular portion is provided with a plurality of positioning ribs that extend from the recessed portion in the fitting direction and are arranged at equal intervals in a circumferential direction of the outer peripheral surface of the tubular portion.

2. The connector according to claim 1, wherein the connector housing has a hood portion that surrounds the terminal accommodating portion;
   wherein a space that opens forward is provided all over an entire circumference of the connector housing between the hood portion and the terminal accommodating portion so as to allow a counterpart hood portion of the counterpart connector to enter the space; and
   wherein the cap body has a flange portion that covers an opening of the space.

3. The connector according to claim 1, wherein the cap has a fall prevention strap.

\* \* \* \* \*